June 20, 1933.   J. P. KOLLA   1,914,667
AIR FILTER
Original Filed June 29, 1931   2 Sheets-Sheet 1

Inventor
John P. Kolla
By Livrance and Van Antwerp
Attorneys

June 20, 1933.  J. P. KOLLA  1,914,667
AIR FILTER
Original Filed June 29, 1931   2 Sheets-Sheet 2
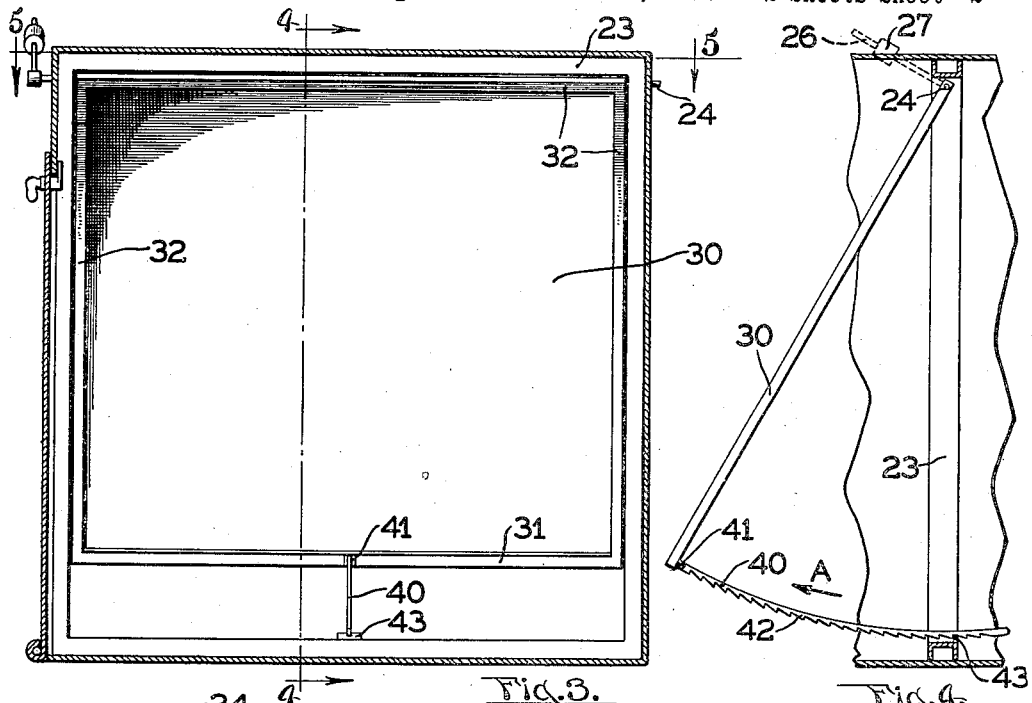
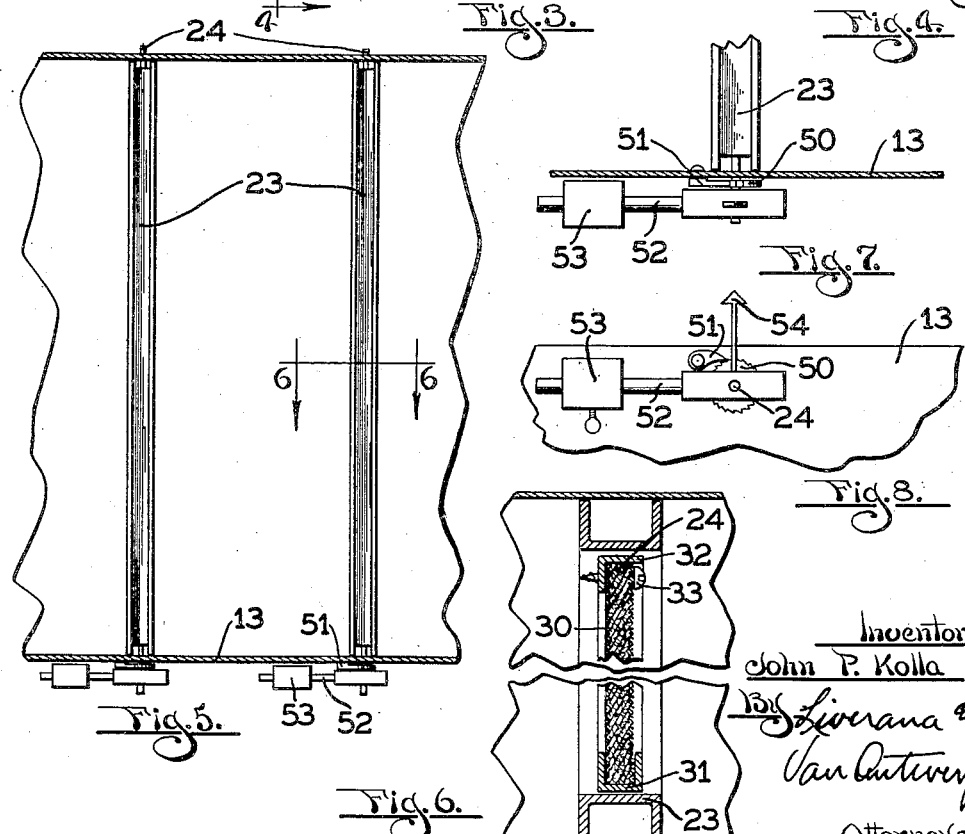
Inventor
John P. Kolla
Attorneys Patented June 20, 1933

1,914,667

UNITED STATES PATENT OFFICE

JOHN P. KOLLA, OF HOLLAND, MICHIGAN, ASSIGNOR TO HOLLAND FURNACE COMPANY, OF HOLLAND, MICHIGAN, A CORPORATION OF MICHIGAN

AIR FILTER

Application filed June 29, 1931, Serial No. 547,515. Renewed May 8, 1933.

This invention relates generally to an air filter and more particularly to an air filter which will automatically by-pass the air when it becomes inoperative.

Filters of this character, which are now widely used, consist merely of a strainer of some type which is positioned across the passageway carrying the air and the air must pass through this stationary strainer. When the strainer becomes clogged the air is prevented from passing therethrough and, in time, the air ceases to flow through the passageway in any appreciable quantity.

Now in my improved filter or strainer I prevent the above difficulty from occurring by so constructing and installing my filter as to permit it to swing to an open position whenever it becomes clogged, thereby allowing the air to by-pass therearound.

Also, another feature of my invention resides in the automatic latching means which holds the filter screen to whatever position it is forced by the air pushing against the clogged screen. This is an advantage in that the several filtering screens will remain in positions so as not to interfere with the flow of air through the passageway after they have once been forced to such position. In other words, the fan or blower may cease to operate after such displacement of the filter has occurred and yet the filtering screens will not gravitate back to their closed position.

Briefly described, my invention consists of a frame member removably carrying a filter screen therein, said frame member being pivotally mounted across the passageway to thereby entirely close the same. Counterbalancing means are provided to normally maintain the screen across the passageway. However, when the screen becomes clogged the pressure of the air displaces it and automatic latching means are provided for maintaining the filter screen in such displaced position. Also, signal or indicating means are provided exteriorly of the passageway whereby the position of the filter screen is known.

In the drawings:—

Fig. 3 is a cross sectional view taken along either of the lines 3—3 of Fig. 1.

Fig. 4 is a view taken along the line 4—4 of Fig. 3.

Fig. 5 is a sectional view taken along the plane of the line 5—5 of Fig. 3.

Fig. 6 is a view taken along the line 6—6 of Fig. 5, this view being partly broken away.

Fig. 7 is a plan view, enlarged, disclosing a modified construction whereby the filter screen may be maintained in its open position.

Fig. 8 is a side view of Fig. 7.

Similar numerals refer to smiilar parts throughout the several views.

Figure 1:
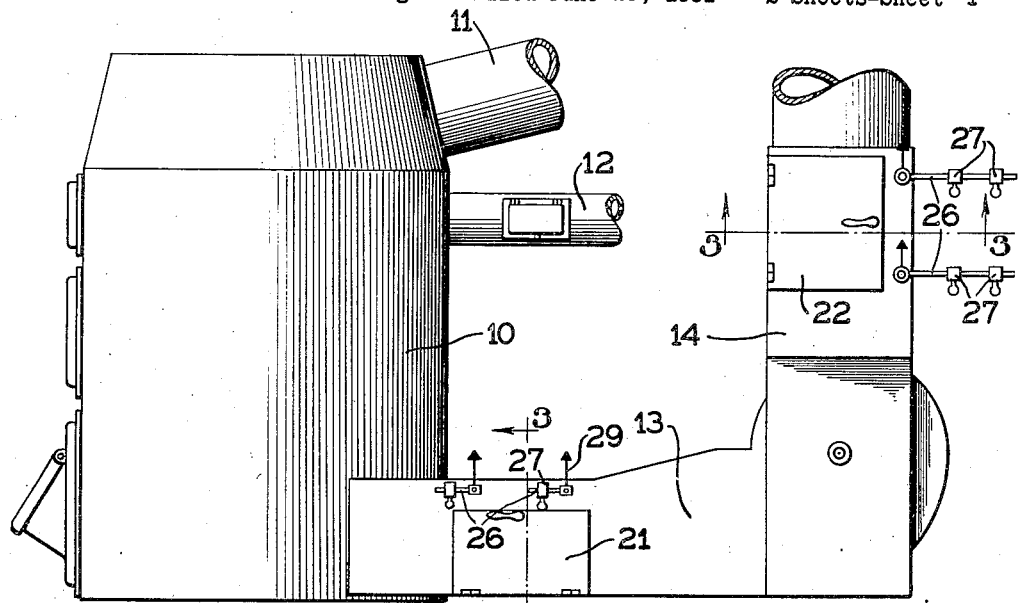
Fig. 1 is a side view of a furnace installation having an incoming air conduit or passageway, this conduit being equipped with my novel filtering means.

Referring particularly to Fig. 1, 10 designates a furnace installation having a hot air pipe 11, a stack pipe 12, and an incoming air passageway or conduit, this conduit consisting of a horizontal section 13 and a vertical section 14.

A fan or blower 15 is positioned at the juncture of these two conduits and forces the air through the conduit as indicated by the arrows.

Figure 2:
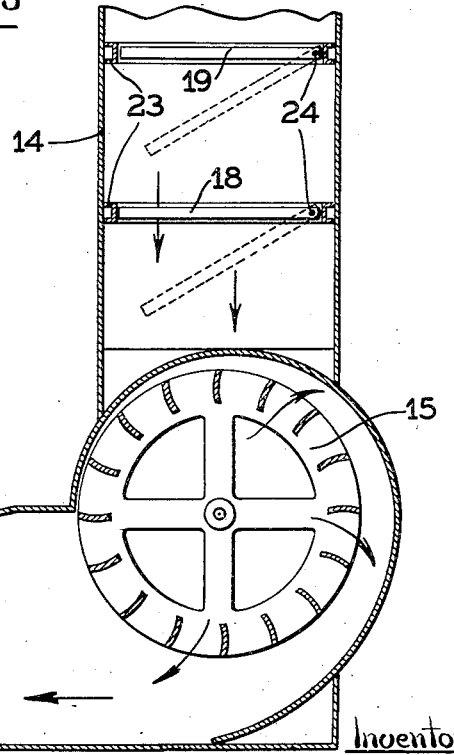
Fig. 2 is a cross sectional view, somewhat diagrammatic in character, illustrating the application of my filtering screen to an ordinary air pipe or conduit.

As is clearly shown in Figs. 1 and 2 the conduit is equipped or provided with filtering screens 16, 17, 18 and 19, these screens being of similar construction. The filtering screens 16 and 17 are positioned within the horizontal portion 13 of the conduit and a door 21 provides access to these screens. A door 22, see Fig. 1, provides access to the horizontally positioned screens 18 and 19.

Frames 23, formed of channel shaped members, extend around the conduit interiorly thereof and the several filtering screens are pivotally mounted therein. Shafts 24 extend through the stationary frames and have the filtering screen frames pivotally mounted thereupon as clearly shown in Fig. 2.

Referring now to Figs. 3 and 4, 30 designates the pivotally mounted filtering screen which swings upon the shaft 24. The shaft 24 has an arm 26 fastened thereto outside of the conduit and a counterweight 27 is slidably connected to the arm. The arm 26 extends at such an angle to the filtering screen 30 as to tend to hold the filtering screen 30 in alinement with the frame member 23, thus closing the passageway and forcing the air to travel through the filtering screen. Indicating arms 29 are attached to the several shafts exteriorly of the conduits and thus enable one to tell the position of the filter screen inside of the conduit.

The inner frame which supports the filtering screen is formed of a channel member 31 and side and top angle members 32. See Fig. 6. The filtering material, which may be formed of screen and steel wool, is removably fastened within the frame by means of the screws 33 as clearly shown in Fig. 6.

As clearly shown in Fig. 4, a rack bar 40 is pivotally mounted to the frame 30, as indicated at 41, and has teeth 42 formed on its lower side. These teeth are adapted to engage with a combined guide and dog 43 and whenever the member 30 swings to the left, as indicated by the arrow A, see Fig. 4, the rack bar 42 freely rides over the locking element 43 but when the filtering screen tends to return to its normal position it is held from so doing by the engagement of the teeth 42 with the locking element 43. The pressure of the air against the filtering screen 30 provides the force to move it to the position as shown in Fig. 4. This position is also indicated in dotted lines in Fig. 2.

Figs. 5, 7 and 8 illustrate a modified form of the automatic latching means. Herein the shaft 24 is provided with a ratchet wheel 50 and a pawl 51 is pivotally mounted upon the casing or conduit member 13. The usual arm 52 with its counterweight 53 is also fastened to the shaft 24. An indicating arm 54 extends upwardly as clearly shown in Fig. 8 and thus indicates the position of the filtering screen. Whenever the filtering screen rotates to the left, as shown in Fig. 4, the pawl 51 rides over the teeth of the ratchet wheel 50 but when the filter screens begins to return the pawl engages one of the ratchet teeth and prevents such return.

From the above description, it will be appreciated that I have inventively created a filter screen which will operate for a long period of time without any attention whatsoever. Also, there is no danger that the air which passes through the conduit will be diminished due to the fact that the screens become clogged. Furthermore, my filtering arrangement is applicable to either a system having an induced draft or one having a forced draft.

Having thus revealed my invention, I claim as new and desire to secure the following combinations and elements, or equivalents thereof, by Letters Patent of the United States.

I claim:

1. In a device of the class described, a conduit, means for inducing a fluid circulation in said conduit, a filter mounted to be located in a position in said conduit to cause passage of fluid therethrough, means associated with said filter mounting to yieldably retain said filter in the aforementioned position, said means yielding by resistance of the filter to the passage of fluid therethrough to permit movement of the filter to a position where the fluid will flow around said filter, and means for retaining the filter in the position to which it is moved by such resistance to flow of fluid.

2. In a device of the class described, a conduit, means for inducing a fluid circulation in said conduit, a filter located in said conduit, pivotal means for mounting said filter whereby the filter may assume a position to cause fluid to flow therethrough and may swing by resistance to the passage of fluid to a position where the fluid will flow around the filter and means associated with said pivotal mounting for yieldably retaining the filter in said first mentioned position.

3. In a device of the class described, a conduit, means for inducing a fluid circulation in said conduit, a filter located in said conduit, pivotal means for mounting said filter whereby the filter may assume a position to cause fluid to flow therethrough and may swing by resistance to the passage of fluid to a position where the fluid will flow around the filter and means associated with said pivotal mounting for yieldably retaining the filter in said first mentioned position, means for retaining the filter in any position to which it is moved by said resistance to passage of fluid therethrough.

4. In a conduit having air flowing therethrough, the combination of, a filter, means for mounting the said filter interiorly of said conduit whereby the air flows therethrough when the filter is in its normal position, means for maintaining said filter in its normal position, a rack attached to the filter, and means engaged by the rack whenever the filter is moved from its normal position to thereby permit the air to flow around the filter.

5. In a device of the class described, an air conduit, a filter screen therein, a shaft for pivotally supporting said screen whereby pressure of the air may move the same, a ratchet wheel on the shaft and a pawl mounted on a fixed support, said pawl being adapted to engage with said ratchet wheel to prevent movement of the filter screen in one direction.

6. In a device of the class described, a conduit adapted to have an air flow therethrough, a filter screen pivotally mounted inside of the conduit, counterbalancing means and means interposed between said counterbalancing means and the pivotally mounted filter screen whereby the filter screen is held in a chosen position for the purpose described.

7. An air filter comprising, a passageway through which the air flows, a frame fastened to the inner side of the passageway, a second frame of lesser size than the first mentioned frame adapted to snugly fit thereinto, said second frame having one of its sides formed of an inwardly facing channel shaped member, a filtering screen removably placed into the said channel and extending across the inner or second frame, means for detachably fastening the filtering screen to the inner or second frame, means for pivotally mounting the second frame so that it may freely swing into and out of the first mentioned frame, said last mentioned means including a shaft extending through both of the frames and which extends interiorly of the passageway, and counterbalancing means on the shaft whereby the inner or second frame tends to remain in alinement with the first mentioned frame.

8. An air filter as set forth in claim 7 but also having automatic latching means engaging the inner or second screen to maintain it open whenever it is swun from its normal position due to the air pressure of the air passing through the passageway.

9. In combination, a conduit adapted to have air flowing therethrough, a filter screen movably mounted in said conduit, and indicating means cooperatively associated with the screen whereby its degree of movement is indicated, said indicating means being possessed of oscillatory movement, said arcuate movements of the indicating means and the filter screen being equal.

In testimony whereof I affix my signature.

JOHN P. KOLLA.